July 2, 1929.    J. M. McGLYNN ET AL    1,719,069
NUT LOCK
Filed June 21, 1928
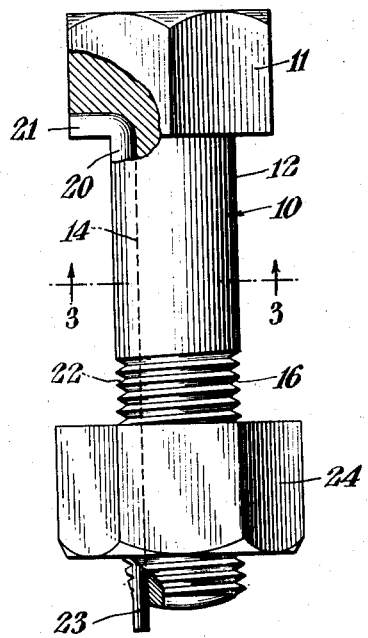
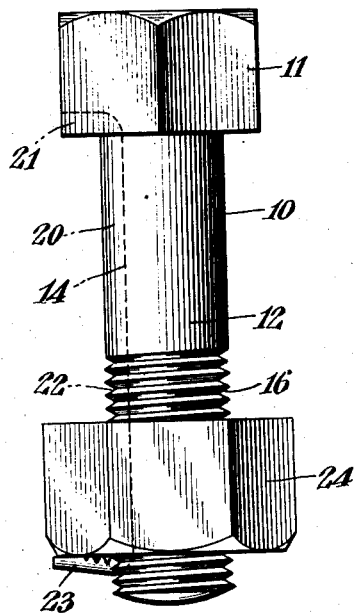
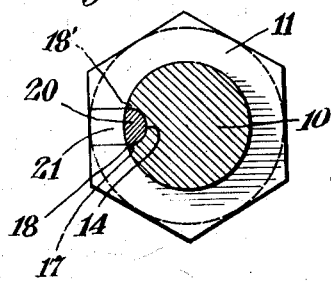
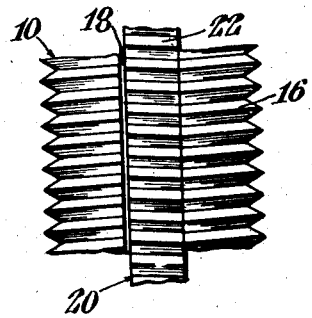
INVENTORS
John M. McGlynn
Thomas F. V. McGlynn
BY
Townsend + Decker
ATTORNEYS Patented July 2, 1929.

1,719,069

UNITED STATES PATENT OFFICE.

JOHN MICHAEL McGLYNN, OF JACKSON HEIGHTS, NEW YORK, AND THOMAS FRANCIS VINCENT McGLYNN, OF PHILADELPHIA, PENNSYLVANIA.

NUT LOCK.

Application filed June 21, 1928. Serial No. 287,150.

This invention relates to improvements in nut locks it being a primary object of the invention to provide a nut locking device which will maintain a nut locked securely on a bolt for an indefinite period.

Other objects relate to a nut locking device which will reenforce the bolt to which it is applied and which may be applied readily and uniformly to the bolt.

A further object relates to the provision of a suitable recess between the locking key and the bolt arranged to receive any displaced metal when threads are cut on the bolt after the key receiving slot has been formed on the bolt.

These and other objects will appear more fully from the following description when considered in connection with the drawings in which:

Fig. 1 is an elevational view of a bolt provided with our invention, parts being broken away.

Fig. 2 is a similar view showing the key bent to position to more securely lock the nut in place.

Fig. 3 is a transverse section taken on the line 3—3 of Fig. 1.

Fig. 4 is a fragmentary face view of the threaded portions of the bolt and key showing the relative inclinations of the threads thereon, and Fig. 5 is a perspective view of the locking key.

In carrying out our invention we make use of a bolt provided with a semi-cylindrical longitudinal recess which extends along the shank of the bolt and outwardly along the inner face of the head of the bolt. The locking key is of substantially the same shape as the removed metal of the bolt so as to fit snugly in the slot thereof to reenforce the same. With a snug fit between the key and slot it is essential, particularly where inexperienced workmen are concerned, to provide against the overhang of the threads, cut on the preformed bolt, from interfering with the assembling of the device. This is accomplished as set forth below without detracting from the invention as a nut locking device.

We have shown our invention as applied to the bolt 10 formed with a headed portion 11 and a shank 12. The bolt is provided with a longitudinal slot 14 which as shown may extend throughout the entire length of the bolt and to and into the head 11, the head 11 having a portion of the metal adjacent the inner face thereof removed for this purpose. The slot 14 is substantially semi-circular in cross-section throughout its entire length for the purpose to be referred to below. The free or outer end of the bolt 12 is formed with a screw-threaded portion 16 of any desired length.

It has been found that threads cut into a slotted bolt project some of the metal of the bolt into the slot or groove during the thread-cutting operation. In order to overcome this difficulty, and to avoid the necessity of a machine operation to remove the overhang of the threads on each bolt, we provide a beveled portion 17 preferably extending throughout the entire length of the shank of the bolt, the beveled portion providing a groove 18 between the key, referred to below, and the sides of the bolt adjacent the slot or keyway. Under some conditions of use we also provide a groove at the other side of the keyway as indicated at 18' in Fig. 3 although ordinarily one such groove is sufficient.

The nut locking device comprises a key 20 formed of relatively strong metal, such for example as steel, and of a cross-section corresponding substantially with that of the slot 14 so that the key may be snugly interfitted within the slot. The exterior portion of the key lies substantially flush with the exterior of the shank 12 and is provided with a screw-threaded portion 22, the threads of which may be arranged at a slight angle with respect to the threads 16 of the bolt for the purpose of wedging the threads of the bolt and nut in tight contact. One end of the key is bent as at 21 to fit within the slot in the head 11, the other end being formed with a flat surface 23 formed by the removal of portions of the threads thereof so as to facilitate the introduction of the nut 24 onto the bolt and to cause proper adjustment of the parts when the threads on the nut engage the threads of the key.

In the formation of the above devices the bolt may be molded or stamped for the formation of the longitudinal slot and thereafter machined and screw-threaded ready for use. The key 20 is likewise molded or stamped into substantially the same shape as the slot 14 with the threads 22, inclined if desired, formed to be positioned adjacent the screw-threads 16.

In attaching the device the key may be readily inserted in the slot in the bolt as any overhang of the threads cut in the bolt will be accommodated by the groove 18 or 18' without interfering with the positioning of the key. The nut 24 is easily screwed onto the threads 16 up to the point of engagement of the threads of the nut with the threads 22 of the key 20. Thereafter, by the use of a suitable wrench, the nut is drawn up to the desired degree of tightness. After the nut has reached the threaded portion 22 of the key the key is pressed tightly into the slot 14 so that the key reenforces the shank of the bolt and due to the semi-circular configuration of the key and slot the key will be fitted nicely within the slot.

When the nut has been screwed up firmly against the devices intervening between the head 11 and nut 24, the engagement of such devices with the angular portion 21 of the key presses the same firmly into the groove in the head 11 and in this way the threads 22, by being shifted slightly, tend to bind more firmly against the inner screw-threads of the nut and to retain the latter on the bolt 22. If the nut is not to be removed for an indefinite period the outer exposed end of the key 20 may be bent down around the nut 24 so as to further insure that the nut will remain in its locked condition.

This invention is an improvement over the prior patent of T. F. V. McGlynn, Patent No. 1,564,700, patented December 8, 1925.

Having now described our invention we claim:

1. In a nut lock and in combination, a screw-threaded bolt having a slot extending longitudinally of the shank thereof, a key snugly interfitted within said slot and having a portion exposed adjacent the outer surface of said shank, said shank and key being separated adjacent the exposed surface thereof to provide a longitudinal slot therebetween adjacent said screw-threaded portion and a screw-threaded nut adapted for engagement with the screw threads of said bolt and to extend over and engage said exposed portion of said key for locking said nut in position.

2. In a nut lock, a screw-threaded bolt formed with a slot extending longitudinally of the shank thereof, a nut locking key interfitted snugly within said slot, said slot being formed with a beveled edge adjacent said screw-threaded portion spacing the side edge of said slot from said key and a screw-threaded nut adapted for engagement with the screw threads of said bolt and to extend over and engage said key for locking said nut in position.

3. In a nut lock, a screw-threaded bolt formed with a slot of general semi-cylindrical form extending longitudinally of the shank thereof, a nut locking key interfitted snugly within said slot, said slot being formed with a beveled edge adjacent said screw-threaded portion spacing the side edge of said slot from said key and a screw-threaded nut adapted for engagement with the screw threads of said bolt and to extend over and engage said key for locking said nut in position.

4. In a nut lock, a screw-threaded bolt formed with a slot extending longitudinally of the shank thereof, a nut locking key interfitted snugly within said slot and provided with a threaded portion exposed adjacent the threads of said bolt, said slot being formed with a beveled edge adjacent said screw-threaded portion spacing the side edge of said slot from said key and a screw-threaded nut adapted for engagement with the screw threads of said bolt and to extend over and engage the exposed threaded portion of said key for locking said nut in position.

5. In a nut lock, a screw-threaded bolt formed with a slot extending longitudinally of the shank thereof, a nut locking key interfitted snugly within said slot and provided with a threaded portion exposed adjacent the threads of said bolt, said slot being formed with a beveled edge adjacent said screw-threaded portion spacing the side edge of said slot from said key, said key being formed with an inclined portion adjacent the outer end thereof for the purpose of reducing the radial length of the combined bolt and key at this portion of the same and a screw-threaded nut adapted for engagement with the screw threads of said bolt and to extend over and engage the threaded portion of said key for locking said nut in position.

6. A bolt comprising a shank having a screw-threaded portion and a head, a longitudinal slot in said shank adapted to receive a locking key, said slot terminating adjacent one side thereof in an outwardly inclined beveled edge extending throughout the length of the screw-threaded portion thereof.

7. In a nut lock, a screw-threaded, headed bolt formed with a slot extending longitudinally of the shank thereof and constructed for being received within an apertured article, said slot extending to and into said head and outwardly along the inner face of said head as a surface depression, a nut locking key interfitted snugly within said slot and extended outwardly in the slot in said head and a nut adapted to engage the screw-threaded portion of said bolt and to extend over and engage said key for compressing said key into the depression in said head by pressure against said article.

Signed at Philadelphia, in the county of Philadelphia and State of Pennsylvania this 14th day of June, A. D. 1928.

THOMAS FRANCIS VINCENT McGLYNN.

Signed at Jackson Heights, Long Island, county of Queens, State of New York, this 12th day of June, 1928.

JOHN MICHAEL McGLYNN.